June 3, 1969
M. J. PIROUTEK
3,447,676
TUBULAR PACKAGE WITH MELT-PIERCED SEAL
Filed Jan. 25, 1968
Sheet 1 of 2
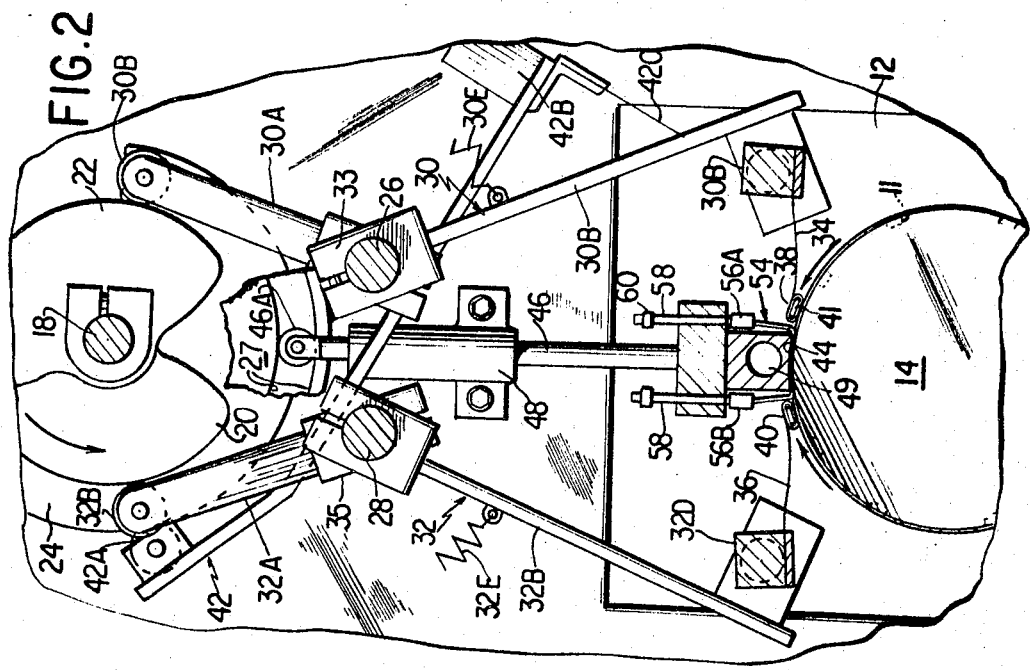
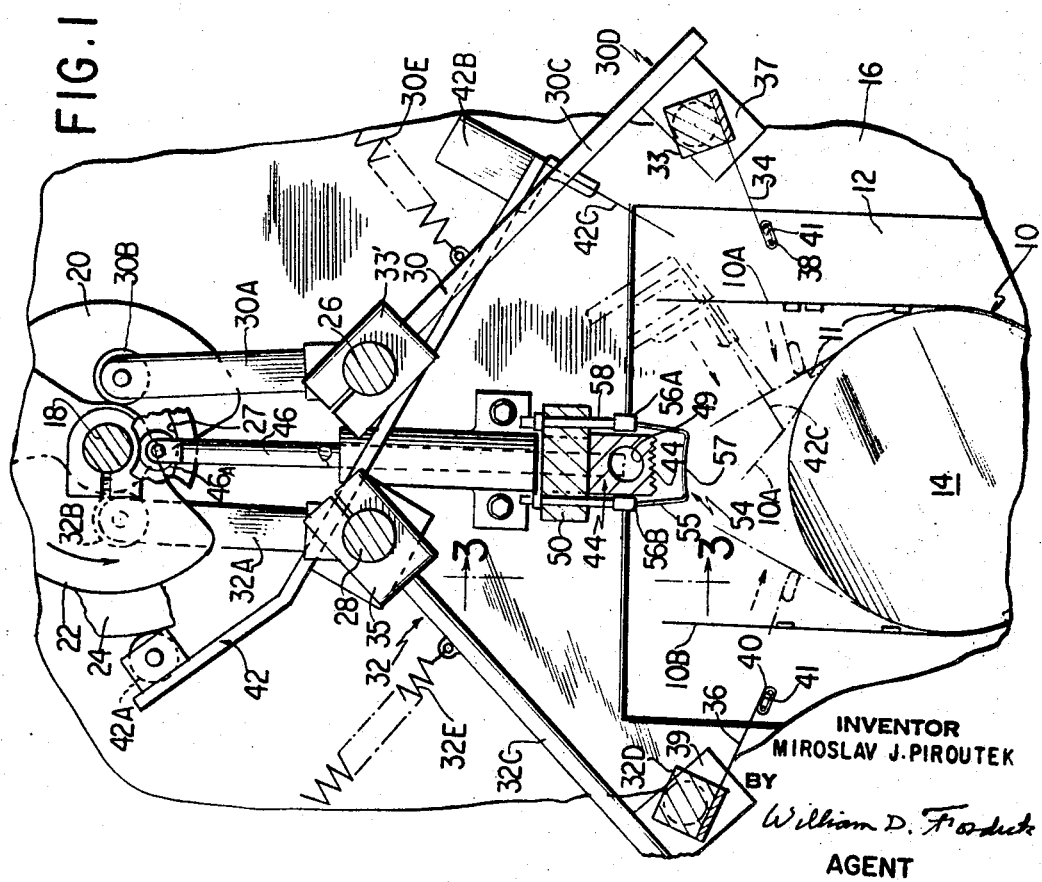
INVENTOR
MIROSLAV J. PIROUTEK
BY
William D. Fosdick
AGENT June 3, 1969 M. J. PIROUTEK 3,447,676
TUBULAR PACKAGE WITH MELT-PIERCED SEAL
Filed Jan. 25, 1968 Sheet 2 of 2
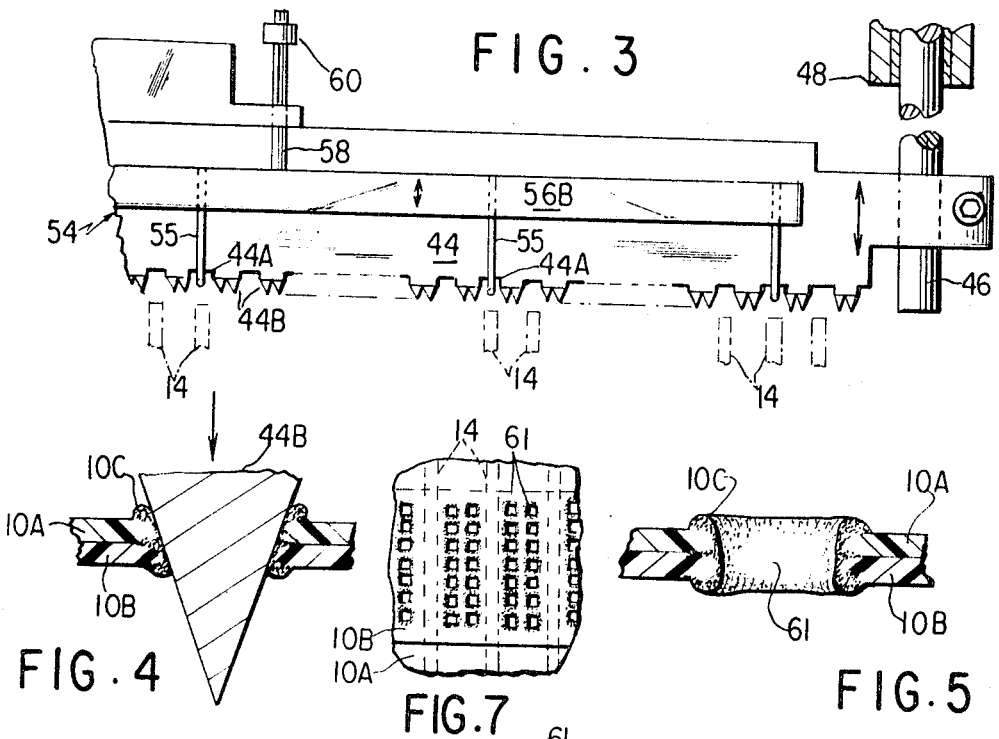
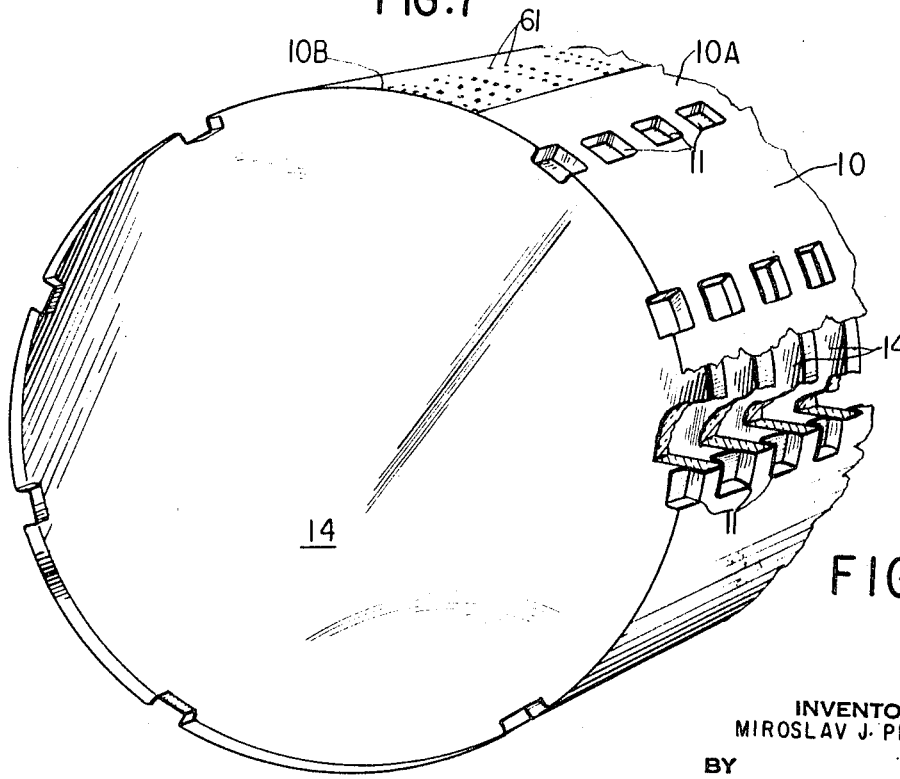
INVENTOR
MIROSLAV J. PIROUTEK
BY
William D. Fosdick
AGENT

UNITED STATES PATENT OFFICE

United States Patent Office 3,447,676
Patented June 3, 1969

3,447,676
TUBULAR PACKAGE WITH MELT-PIERCED SEAL
Miroslav J. Piroutek, Stamford, Conn., assignor, by mesne assignments, to Corning Glass Works, Corning, N.Y., a corporation of New York
Original application Nov. 17, 1964, Ser. No. 411,819. Divided and this application Jan. 25, 1968, Ser. No. 700,502
Int. Cl. B65d 85/62
U.S. Cl. 206—65      4 Claims

ABSTRACT OF THE DISCLOSURE

A seal is made in resilient plastic sheet material held tightly wrapped around articles to be packaged, in regions of plastic material which are unsupported from inside the package, by melt-piercing overlapped edges of the material to leave the edges fastened together by spaced rings of fused plastic. An automatic machine wraps the sheet and holds the overlapped edges of the plastic material against its resilience while the seal is formed by groups of melt-pierced holes located at positions between the spaced peripheries of the articles in the package.

Cross-reference to related application

This application is a division of my copending application, Ser. No. 411,819, filed Nov. 17, 1964, now Patent No. 3,374,598.

Background of the invention

The present invention relates to packages and to the sealing of plastic wrapped packages containing articles therein. More particularly, the invention relates to a seal and a method and apparatus for sealing a package of heat fusible plastic when there are a number of articles therein.

In the packaging art, using heat fusible plastic sheets, there has been difficulty in finding suitable ways to form a final seal on unsupported regions of the plastic material in a package. Since the introduction of heat-fusible packaging materials, the final seal between adjacent surfaces of two edges has been made by imposing pressure through them from opposite surfaces and bonding them by use of heat. In many cases, to provide access to both surfaces of the material in the seal region, the resulting sealed portion of the package projected outwardly, and the necessity of using such a seal arrangement considerably limited the available package configurations and characteristics. Moreover, the areas of the package material adjacent to the protruding seal subjected one border of the seal to tension stress which tended progressively to peel the two edges apart, providing very limited load capacity.

Additionally, in the packaging field, there are certain fragile types of articles which have been difficult to package. Among these are disc-like articles such as glass headlight lenses and reflectors, dishes, and the like, which may be arranged front to back so as to form a stack. Copending application Ser. No. 301,562, filed Aug. 12, 1963, discloses a packaging method and packages for handling such articles in which a sheet of stiffly flexible, resilient plastic is wrapped around a stack of spaced disc-like articles, the sheet having spaced bosses or dimples formed therein projecting inwardly to maintain the spacing of the disc-like articles, and the longitudinal edges of the sheet are overlapped in an opposite ended relationship to close the package.

The sealing of such a package poses a problem because the package must be sealed while the plastic sheet is maintained tightly wrapped around the disc-like articles, against its flexural resilience. The normal impulse or pressure sealing devices can not be used because they require that the regions to which the pressure and heat are applied be supported or backed up from the interior of the package. Further, adhesive or glue seals require too long for setting to be compatible with the desired production rate of such packages.

It is, therefore, an object of the present invention to provide primarily a method for sealing opposite ended overlapped sheets of heat fusible plastic material and an apparatus therefor.

Another object of the invention is to provide a method for sealing a package made out of resilient heat fusible plastic in a region of the plastic which is unsupported from inside while such plastic is tightly wrapped around packaged articles.

A further object is to provide both a sealing method and apparatus for heat sealing heat fusible plastic sheets around the periphery of a cylindrical stack of disc-like objects.

Summary of the invention

Accordingly, the invention provides a method of sealing a package by using heat fusible plastic in which the closing edges of the plastic sheet are arranged in opposite ended overlapping relationship and then are melt-pierced in the overlap portions at a plurality of spaced positions to leave the edges fastened to each other by spaced rings of fused plastic.

The invention further provides a method of sealing heat fusible plastic as a package where the plastic is resilient and wherein the plastic is placed in opposite ended overlapped relationship and held in such relationship against its resilience. While the edges are so held, both of said sheets are melt-pierced in the overlapped portions at spaced positions to leave the edges fastened to each other by spaced rings of fused plastic.

The invention additionally provides apparatus for carrying out the above method in which a melt-piercing sealing head has a plurality of heated tapered piercing points that are spaced from each other and means for heating such points to a temperature which is above the melting point of the plastic to be sealed.

The invention also provides that the above apparatus be provided in a frame which holds a cylindrical stack of disc-like articles around which a resilient plastic sheet has been wrapped to form a hemicylinder with upright sides. The apparatus which is illustrated herein as embodying the invention has means for completing the tight wrapping of the upright sides of the plastic sheet around the articles in the stack with the edges in an opposite ended overlapped position and means for holding the edges in the position where the above-recited sealing head may operate against the overlapped edges of the sheet to seal them at a plurality of spaced positions by rings of fused solidified plastic.

It is an advantage of the resulting seal structure that a strong enduring package is produced, suitable for holding and shipping large numbers of articles imposing a large load on the seal without failure.

The above objects and further features and advantages of the invention will appear more fully from the following description in connection with the accompanying drawings.

Brief description of the drawing

FIG. 1 is a fragmented end elevational view, partially in vertical section, of a heat sealing apparatus according to the present invention;

FIG. 2 is a similar view of the apparatus of FIG. 1 in a second operative position;

FIG. 3 is an enlarged side elevation of a portion of the apparatus taken along line 3—3 of FIG. 1;

FIG. 4 is a greatly enlarged section illustrating the action of one of the melt-piercing points of the head of FIG. 3;

FIG. 5 is a section of the resultant ring of fused plastic after the sealing point has been removed from FIG. 4;

FIG. 6 is a perspective view of a portion of a package made according to the present invention; and FIG. 7 is a plan view of a seal made according to the present invention.

Description of the preferred embodiments

In FIGS. 1 and 2, there is shown an apparatus for performing the method of the present invention. This apparatus is seen in two different phases of its sequence of operations and which are illustrative of the invention. A sheet of resilient heat fusible plastic 10 having spacing bosses 11 is placed in a form 12 to hold a plurality of disc-like articles 14 in spaced front to back relationship to form a generally cylindrical stack. The disc-like objects 14 form the sheet into a generally hemicylindrical shape with upstanding sides 10A, 10B. The form 12 is supported in a frame 16. Vertically above the stack of disc-like articles 14, there is a rotatable driven center shaft 18, both ends of which are journaled in the frame 16 (in the illustration, only one end of the frame 16 is shown so as to reveal the arrangement of the parts, but it should be understood that there is a similar end of the frame 16 out of the plane of the drawing towards the viewer). A source of power (not shown), such as an electric motor and worm-gear drive, rotates the main shaft 18. At spaced positions along the length of the shaft 18, there are mounted a plurality of cams 20, 22, 24, the operation which will be described hereinafter.

On either side of an imaginary vertical centerline which runs through the main drive shaft 18, there is disposed a pair of longitudinally extending pivot shafts 26, 28. These pivot shafts are equidistant from the vertical centerline and have secured thereon wrapping arms 30, 32. These arms each have an upper portion 30A, 32A with cam follower rollers 30B, 32B on the end thereof, while the lower arm portions 30C, 32C carry wrapping and clamping jaws, generally indicated at 30D, 32D. These jaws each include a mounting bar 33 adjustably secured in a block 37 for supporting a plurality of resilient leaves or spring-like members 34, 36 and on the ends of which there is fixed a tip of high friction character such as rubber friction tube strips 38, 40, each surrounding a longitudinally extending rigid steel bar 41, which bars are secured to the respective spring members 34, 36.

The position of the resilient members 34, 36 is such that when the arms 32, 30 are swung toward each other about their respective shafts 26, 28, the rubber strip tips frictionally engage the upright sides 10A, 10B of the resilient plastic sheet to tightly wrap it around the articles. Cam 20 is fixed on the shaft 18 at a position to operate the follower roller 32B and has a contour that causes the arm 32 to swing outwardly and inwardly in a predetermined timed sequence. Cam 22 has an exactly opposite contour to that of cam 20, and it is arranged on shaft 18 to operate its follower roller 30B to actuate the other arm 30 in the same timed sequence. Thus, upon rotation of shaft 18, the cams 20 and 22 are positioned to cause identical but opposite movements of the wrapping arms 30, 32.

A pair of tension springs 30E and 32E are shown as means to hold the cam follower rollers 30B and 32B in engagement with the respective cams 20 and 22. To provide adjustment if desired, the lower arm portions 30C and 32C are adjustably held by clamp blocks 33' and 35 on the shafts 26 and 28. Also, the leaf spring members 34 and 36 are secured by adjustable clamp blocks 37 and 39 on the ends of the lower arm portions 30C and 32C.

A tuck-in arm 42 is swingably mounted on pivot shaft 28 with an upper follower roller 42A and a weighted lower end 42B carrying a tuck-in blade 42C. On shaft 18 there is a cam 24 (shown partially fragmented in FIG. 1), which is positioned on the shaft 18 so as to cause the tuck-in arm 42 to strike against the upright portion 10A of the plastic sheet to push and wrap it under the opposite upright portion 10B of the sheet as they are wrapped toward each other by the wrapping arms 30, 32.

Directly above and along the imaginary vertical centerline, there is a means for both holding the plastic sheet after it has been wrapped and before sealing the sheet, exemplified by a melt-piercing head 44 fixed to reciprocate with a pair of drive rods 46 (one shown) within a guide 48 at each end of the head 44. The sealing head 44 is an elongated metal block extending throughout the package length between the end portions of frame 16 and above the center of the stack of disc-like articles 14. Each rod 46 has a follower roller 46A at its upper end which is operated by a cam 27 (FIG. 2) to reciprocate the rod 46. A heater 49 extends longitudinally of the sealing head 44. The heater may be an electrical resistance unit of the type that is known in the art, such as a "Calrod" heater and may be provided in a standard size which gives a predetermined temperature that is selected in relation to the melt temperature of the plastic to be sealed. The heater 48 within the sealing head 44 is in heat transfer relationship therewith and maintains the heating head at a temperature above the melting temperature of the plastic to be sealed.

A collar block 50 is affixed above the sealing head 44. Below the heat sealing head 44, there is a cage-like means 54 for holding down the edges of the plastic sheet during sealing as shown in FIG. 2. The cage-like means consists of a multiplicity of spaced U-shaped wires 55 that have their ends affixed in bars 56A, 56B which bars have extending from their tops a number of slide bolts 58. The slide bolts in turn pass through the shoulder portion of the collar block 50 and have stopnuts 60 on their ends. Accordingly, the cage-like means 54 is free to reciprocate between the limits of the stopnuts 60 and the bars 56A, 56B. As shown in FIG. 2 when the sealing head 44 is in its operative position, the weight of the cage-like means 54 is resting on the overlapped portion of the edges of the plastic sheet and holds them in position against their flexural resilience during the sealing operation. The spaced U-shaped wires 55 each have lower transverse portions 57 with a configuration conforming to the shape of the articles 14. In this example, the transverse cage portion 57 is concave. Also, the lower surface of melt-piercing head 44 has a similar concave configuration, as seen in FIG. 1.

The sealing head 44 is better shown in FIG. 3 where the enlargement illustrates the details of the construction. The view shows the head 44 secured to one of the drive rods 46 and with the cage-like means 54 in the position it would occupy during the melt-piercing operation. The wires 55 of the cage are received in recesses 44A between the grouped heated projecting piercing sealing elements 44B. In this illustrative embodiment, each of these projecting elements 44B is tapered to a sharp point, and they are grouped in lines of pairs to melt and pierce the plastic sheet 10 between the rims of the disc-like articles 14 (see FIGS. 3, 6 and 7). The sealing head 44 is here illustrated as having projecting elements 44B arranged in pairs of contiguous pyramidal shaped points in a line of seven pairs for engaging unsupported regions of the plastic sheet where it is bridged across between the peripheries of the articles 14 (FIG. 7) to leave semirectangular rings of fused plastic holding together the overlapped edge 10A, 10B of the package (FIG. 6).

To illustrate the action of melt-piercing for sealing, FIGS. 4 and 5 are shown. Here, the overlapped plastic edges 10A, 10B are being pierced by the heated tapered point 44B which causes a ring 10C of molten plastic to be formed. The result is that the ring fuses by cooling as shown in FIG. 5 upon the withdrawal of the points.

The fact that there is a solidified peripheral layer or ring of fused plastic extending around each pierced hole 61 provides the closure bond, and the cross-sectional shape of the point 44B and the resultant fused rings 10C are not critical.

An important consideration in a proper appreciation of the invention is that there is provided a method of sealing a package from the outside after wrapping. Melt-piercing of overlapped edges of heat fusible plastic is the step that provides the seal for the package. Strength in the seal is provided by grouping the piercing points to leave the desired number of spaced rings of fused plastic binding together the edges to be sealed.

A further feature of the invention is that the method be used to seal a resilient plastic by holding the opposite-ended overlapped edges in position during sealing. The disclosure herein shows the function to be performed by the cage-like means 54 which is freely reciprocable on the sealing head 44. Thus, as in FIG. 1 when the shaft 18 rotates, the cams 20, 22 cause the wrapping arms 30, 32 simultaneously and tightly to wrap the edges 10A, 10B inwardly as shown by the dashed lines. Tuck-in arm 42 is then moved by cam 24 to tuck edge 10A under 10B, and next cam 27 causes the rod 46 to move downwardly allowing cage 54 to rest against the overlapped edges to hold them against their resilience. Sealing head 44 then comes down and seals the edges of the sheet as previously described and shown in FIG. 2.

The method followed by the apparatus allows the fabrication of a package of great strength because the tightly wrapped resilient plastic sheet forms a body of inherently great strength. Such a body may be formed quickly by the illustrated apparatus because of the extreme rapidity of the heating and cooling of the plastic. Also the fact that the melt-pierced seal is in the plane of the wrapped articles places it in the best position to resist any breaking forces. Thus, packages formed and sealed as shown in FIG. 6 are capable of being handled very roughly without breakage and great savings have been provided in reducing breakage and the cost of packaging.

The packages shown have been wrapped and sealed in biaxially oriented polystyrene because of its low cost, its resilient properties and low melting temperature. Other of the many well-known heat fusible plastics may be selected as desired to obtain the package characteristics that are desired.

In this illustrative example of the invention, the disc-like articles have a circular periphery and the tubular package is a circular cylinder. It is to be understood that the disc-like articles may have oval, scalloped, polygonal, rectangular and irregular peripheries, and the package then has a tubular configuration generally conforming to the periphery of the articles therein. Accordingly, the terms "disc-like" and "tubular" are to be interpreted to include these configurations.

Although the methods and apparatus of the specific examples of the invention have been described and illustrated herein, it is intended that the invention be only limited by the claims appended hereto.

What is claimed is:
1. A tubular package containing a multiplicity of disc-like articles comprising a stack of a multiplicity of said articles disposed in front to back relationship with spaces between each of the articles in the stack, a sheet of heat fusible resilient plastic wrapped tightly around the peripheries of the articles in said stack with the opposed edges of the tightly wrapped plastic sheet overlapping, said overlapped edges being sealed together by a plurality of groups of closely spaced holes, each hole being surrounded by a ring of fused plastic having a thickness extending through both sheets bonding the two overlapped edges together, and said groups of closely spaced holes being located in the unsupported regions of the overlapped edges where the plastic material is bridged across between the peripheries of the articles of the stack.

2. A tubular package comprising a plurality of articles having similarly shaped peripheries, a sheet of heat fusible resilient plastic wrapped tightly around said peripheries of said articles with opposed edges of said sheet overlapping, said edges being sealed together by a plurality of spaced holes, each hole being surrounded by a ring of fused plastic having a thickness extending through both sheets and bonding the two overlapped edges together, said holes being located in unsupported regions of the overlapped edges where the plastic material is bridged across said peripheries of said articles.

3. A package according to claim 2 in which said articles are disposed in front-to-back relationship with spaces between said articles.

4. A package according to claim 2 in which said overlapped edges are sealed together by a plurality of groups of closely spaced holes.

References Cited

UNITED STATES PATENTS

| | | | |
|---|---|---|---|
| 2,545,243 | 3/1951 | Rumsey. | |
| 3,075,573 | 1/1963 | Piazze | 229—48 |
| 3,092,439 | 6/1963 | Harrison. | |
| 3,357,554 | 12/1967 | Walter | 206—65 |

JAMES B. MARBERT, *Primary Examiner.*